United States Patent [19]

Dinwoodie

[11] Patent Number: 5,746,839
[45] Date of Patent: May 5, 1998

[54] LIGHTWEIGHT, SELF-BALLASTING PHOTOVOLTAIC ROOFING ASSEMBLY

[75] Inventor: Thomas L. Dinwoodie, Berkeley, Calif.

[73] Assignee: PowerLight Corporation, Berkeley, Calif.

[21] Appl. No.: 629,052

[22] Filed: Apr. 8, 1996

[51] Int. Cl.$^6$ .................................................. E04D 13/18
[52] U.S. Cl. .................... 136/251; 136/246; 136/291; 52/173.3
[58] Field of Search ................................ 136/246, 251, 136/291; 52/173.3

[56] References Cited

U.S. PATENT DOCUMENTS

| | | | |
|---|---|---|---|
| 3,769,091 | 10/1973 | Leinkram et al. | 136/246 |
| 4,040,867 | 8/1977 | Forestieri et al. | 136/244 |
| 4,189,881 | 2/1980 | Hawley | 52/91.3 |
| 4,321,416 | 3/1982 | Tennant | 136/244 |
| 4,389,533 | 6/1983 | Ames | 136/248 |
| 4,674,244 | 6/1987 | Francovitch | 52/173.3 |
| 4,677,248 | 6/1987 | Lacey | 136/244 |
| 4,835,918 | 6/1989 | Dippel | 52/63 |
| 4,860,509 | 8/1989 | Laaly et al. | 52/173.3 |
| 4,886,554 | 12/1989 | Woodring et al. | 136/244 |
| 5,092,939 | 3/1992 | Nath et al. | 136/251 |
| 5,112,408 | 5/1992 | Melchior | 136/251 |
| 5,316,592 | 5/1994 | Dinwoodie | 136/244 |
| 5,338,369 | 8/1994 | Rawlings | 136/246 |
| 5,505,788 | 4/1996 | Dinwoodie | 136/246 |
| 5,524,401 | 6/1996 | Ishikawa et al. | 52/173.3 |
| 5,647,915 | 7/1997 | Zukerman | 136/251 |

FOREIGN PATENT DOCUMENTS

| | | | |
|---|---|---|---|
| 3611542 | 10/1987 | Germany | 136/246 |
| 59-175169 | 2/1985 | Japan | 136/251 |
| 3-200376 | 9/1991 | Japan | 136/251 |
| 5-280168 | 10/1993 | Japan | 136/251 |

*Primary Examiner*—Aaron Weisstuch
*Attorney, Agent, or Firm*—Townsend and Townsend and Crew LLP

[57] ABSTRACT

A photovoltaic roofing assembly comprises a roofing membrane (102), a plurality of photovoltaic modules (104, 106, 108) disposed as a layer on top of the roofing membrane (102), and a plurality of pre-formed spacers, pedestals or supports (112, 114, 116, 118, 120, 122) which are respectively disposed below the plurality of photovoltaic modules (104, 106, 108) and integral therewith, or fixed thereto. Spacers (112, 114, 116, 118, 120, 122) are disposed on top of roofing membrane (102). Membrane (102) is supported on conventional roof framing, and attached thereto by conventional methods. In an alternative embodiment, the roofing assembly may have insulation block (322) below the spacers (314, 314', 315, 315'). The geometry of the pre-formed spacers (112, 114, 116, 118, 120, 122, 314, 314', 315, 315') is such that wind tunnel testing has shown its maximum effectiveness in reducing net forces of wind uplift on the overall assembly. Such construction results in a simple, lightweight, self-ballasting, readily assembled roofing assembly which resists the forces of wind uplift using no roofing penetrations.

54 Claims, 8 Drawing Sheets

LIGHTWEIGHT, SELF-BALLASTING PHOTOVOLTAIC ROOFING ASSEMBLY

This invention was made with Government support under Agreement No. FG01-95EE15638 awarded by the Department of Energy. The Government has certain rights in this invention.

CROSS REFERENCE TO RELATED APPLICATIONS

This application is related to U.S. Pat. No. 5,316,592, issued May 31, 1994 to Dinwoodie, and U.S. Pat. No. 5,505,788, issued Apr. 9, 1996 to Dinwoodie, the disclosures of which are incorporated by reference.

BACKGROUND OF THE INVENTION

This invention generally relates to a photovoltaic roofing assembly, and in particular to a lightweight photovoltaic roofing assembly requiring no roofing penetrations and which resists wind up-lift due to specialized component geometry and by acting as an integral assembly.

As the cost of solar cells declines, the non-solar cell components necessary for a functioning photovoltaic system begin to dominate the overall system costs. For this reason, there is a growing trend to develop photovoltaic assemblies which eliminate or reduce non-solar cell components, and where the photovoltaic cell displaces conventional building components. Special care must be taken to ensure that new products based on photovoltaic materials remain safe with respect to environmental factors such as wind-loading and environmental stresses.

A prior art photovoltaic roofing assembly is shown in U.S. Pat. No. 4,886,554 issued Dec. 12, 1989 to Woodring et al. Woodring's assembly includes a plurality of insulation blocks disposed as a layer on top of a roofing membrane, a plurality of concrete pavers disposed as a layer on top of the plurality of insulation blocks, and a plurality of photovoltaic cells, each supported on a respective paver. A key feature of Woodring's assembly is the attachment of the solar cell to the supporting paver. But such attachment suffers from several disadvantages:

a) by including a roofing paver, the assembly is more complicated than necessary and more costly to manufacture.

b) the assembly does not employ a method by which to limit the temperatures experienced by the solar cells and other components. Solar cells are known to decline in efficiency with increasing temperatures. Hence, by offering no mechanism for temperature abatement, the assembly will operate less efficiently, with unknown long-term effects due to high temperature exposure.

c) by placing both a concrete paver and photovoltaic module onto the insulation block, the insulation block is inhibited from ventilating and expiring moisture. As a result, upon exposure to moisture, the insulation block takes longer to dry out, thus reducing its insulating value and degrading the integrity of the insulation block over time.

d) the assembly has multiple modes of potential failure, which include the paver component and its means of bonding. These components will be subjected to 20–30 years of an exposed and harsh weather environment at elevated temperatures. Any form of delamination is unacceptable. Delamination would cause dislocation of solar cells due to wind loading, and potential exposure of the insulation and membrane layers below.

Another prior art solar roofing assembly is shown in U.S. Pat. No. 4,674,244 issued Jun. 23, 1987 to Francovitch. Frankovitch's assembly includes a roof substrate which is substantially flat, an insulation structure thereon having an inclined surface, an elastomeric membrane over the substrate and the structure, the membrane being applied to and supported by the substrate and structure, and supporting an array of photocells. A key feature of this assembly is the attachment of the solar cell directly to the roofing membrane. By such attachment, this assembly suffers from several disadvantages:

a) the assembly does not employ a method by which to limit the temperatures that will be experienced by the solar cells and roofing membrane, thus reducing the efficiency of the solar cells and reducing the life of the roofing membrane.

b) the assembly has multiple modes of potential failure, which include failure due to thermal stresses on the roofing membrane and its means of bonding.

c) the assembly requires roof fasteners which penetrate the protective roofing membrane, which make the installation much more complicated and more costly than is necessary. In addition, such penetrations increase the risk of water leakage, with consequent damage to the building and its contents.

Other patents related to a photovoltaic roofing assembly include U.S. Pat. Nos. 4,835,918 issued Jun. 6, 1989 to Dippel; 4,189,881 issued Feb. 26, 1980 to Hawley; 3,769,091 issued Oct. 30, 1973 to Leinkram et al; 4,040,867 issued Aug. 9, 1977 to Forestieri et al; 4,321,416 issued Mar. 23, 1982 to Tennant; 4,860,509 issued Aug. 29, 1989 to Laaly et al; 5,092,393 issued March, 1992 to Nath et al; 5,112,408 issued May, 1992 to Melchior, 4,389,533 issued Jun. 21, 1983 to Ames; 4,677,248 issued Jun. 30, 1987 to Lacey; 5,338,369 issued Aug. 16, 1994 to Rawlings; German patent No. DE 3611542 A1 issued Apr. 5, 1986 to Cohausz et al.; and Japanese patent No. 3-200376 issued Sep. 2, 1991.

SUMMARY OF THE INVENTION

According to the present invention, a lightweight, self-ballasting solar cell roofing assembly is preferably formed with two portions. One portion consists of a plurality of photovoltaic modules, together with spacers which rest on a conventional building rooftop. The spacers are preferably pre-formed and are sized and configured to provide passageways beneath the photovoltaic modules extending from at least two sides of the modules to reduce uplift forces on the modules. The photovoltaic modules with spacers preferably have interlocking edges or corners. The second portion is a means of perimeter securement which avoid roof membrane penetrations, such as the use of roofing pavers.

The photovoltaic module portion is situated over the building rooftop in a manner to be exposed to solar radiation and electrically connected for transport of electricity. The paver portion is situated over the same building and interlocks with the photovoltaic modules with spacers. Other means of perimeter securement are possible, including placing metal flashing along the edge of the perimeter modules and connecting the flashing end-to-end around the array perimeter, or adhering said flashing to the roofing membrane. The photovoltaic module performs the multiple functions normally provided by a roofing paver, including ballast, UV protection, and weather protection for the membrane and insulation layers below. Together the two portions serve the dual function of a self-ballasted protective roof covering and an assembly for the collection of radiant energy.

In an alternate embodiment, the solar cell roofing assembly is formed with three portions. The first portion consists of a plurality of insulation blocks which are situated on a conventional roofing membrane. The second portion consists of a plurality of photovoltaic modules, together with spacers which rests on the plurality of insulation blocks. The insulation blocks with photovoltaic modules and spacers have interlocking edges. The photovoltaic module performs multiple functions, including ballast, UV protection, and weather protection for the membrane and insulation layers below. A third portion is a means of perimeter securement, such as metal flashing or conventional roofing pavers, located at the perimeter of arrays of photovoltaic modules and tying the entire array together as an integral assembly. Other means of perimeter securement are also possible. Together the three portions serve the dual function of a protected membrane roofing system and an assembly for the collection of radiant energy.

Accordingly, the present invention provides several features and advantages:

a) a detailed geometry for lightweight photovoltaic roofing tiles and assemblies which ensure adequate resistance to wind uplift forces acting on a building rooftop while eliminating the need for roof membrane penetrations for holddown;

b) a roofing assembly which weighs roughly one-sixth to one-third that of conventional ballasted roofs, thus reducing or eliminating the need for added building structural support;

c) an assembly which works with virtually all built-up and single ply membranes, and an assembly which can be free of chlorinated fluorocarbon;

d) a simple and low-cost photovoltaic roofing assembly, where components within the product provide multiple functions as a roofing component, including ballast, weather protection, and UV protection for the insulation and waterproof membrane below;

e) a photovoltaic roofing assembly which enjoys ease of fabrication due to its simple construction;

f) a photovoltaic roofing assembly that displaces the costs of conventional roofing materials and their installation, thereby enhancing the value of the photovoltaic portion as a synergistic building component;

g) a product with minimal modes of potential failure;

h) a roofing assembly which yields social benefits by making photovoltaic technology more cost competitive. This facilitates transition to a clean, renewable energy economy, and helps to mitigate air pollution and global warming.

The foregoing and other features and advantages of the invention will be more fully apparent from the description of the preferred embodiments of the invention when read in connection with the accompanying drawings.

DESCRIPTION OF THE PREFERRED EMBODIMENTS

Description of FIGS. 1A–1D:

Spacer Geometry Directly on Roofing Membrane

Figure 1A:
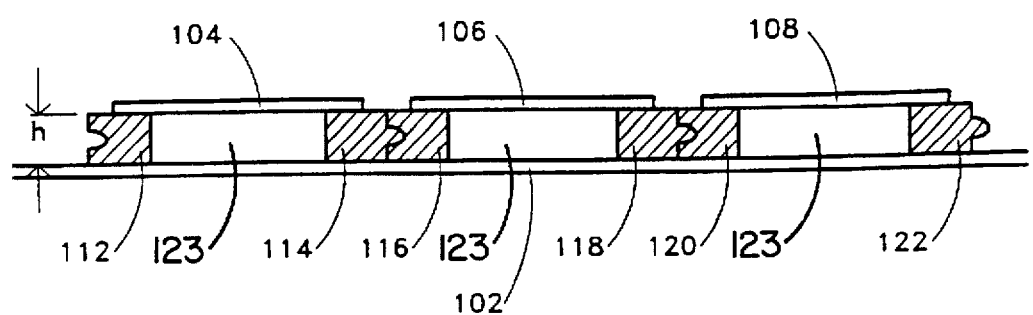
FIGS. 1A to 1D show views of one embodiment of the invention with spacers resting directly on a roofing membrane and with spacer geometry designed to minimize wind uplift on the overall assembly.

FIG. 1A shows a sectional view of a photovoltaic roofing assembly. The assembly includes a plurality of photovoltaic modules 104, 106, 108, a plurality of pre-formed spacers, pedestals, or supports 112, 114, 116, 118, 120, 122 which are respectively disposed below the plurality of photovoltaic modules 104, 106, 108 and integral therewith, or fixedly connected thereto. Spacers 112, 114, 116, 118, 120, 122 are disposed on top of a roofing membrane 102. Photovoltaic modules 104, 106, 108 and the associated spacers 112–122 define open regions 123 beneath the photovoltaic modules.

Membrane 102 is supported on conventional roof framing (not shown), and may be attached thereto by conventional methods, such as fasteners or adhesives. Membrane 102 may also rest directly on an insulation block which is supported on conventional roof framing. Modules 104, 106, 108 are electrically connected using electrical conductors (not shown) and are arranged in an array of modules. Each of modules 104, 106, 108 has at least one photovoltaic cell. Examples of photovoltaic modules include those incorporating thin-film deposition onto glass, stainless steel or ceramic substrates and manufactured by such companies as Solarex Corporation, United Solar Systems Corporation, Energy Photovoltaics, Inc. and Astropower, Inc., and modules of single or polycrystalline silicon cells such as those manufactured by Astropower, Inc., Siemens Solar Industries, and Solarex Corporation.

Figure 1B:
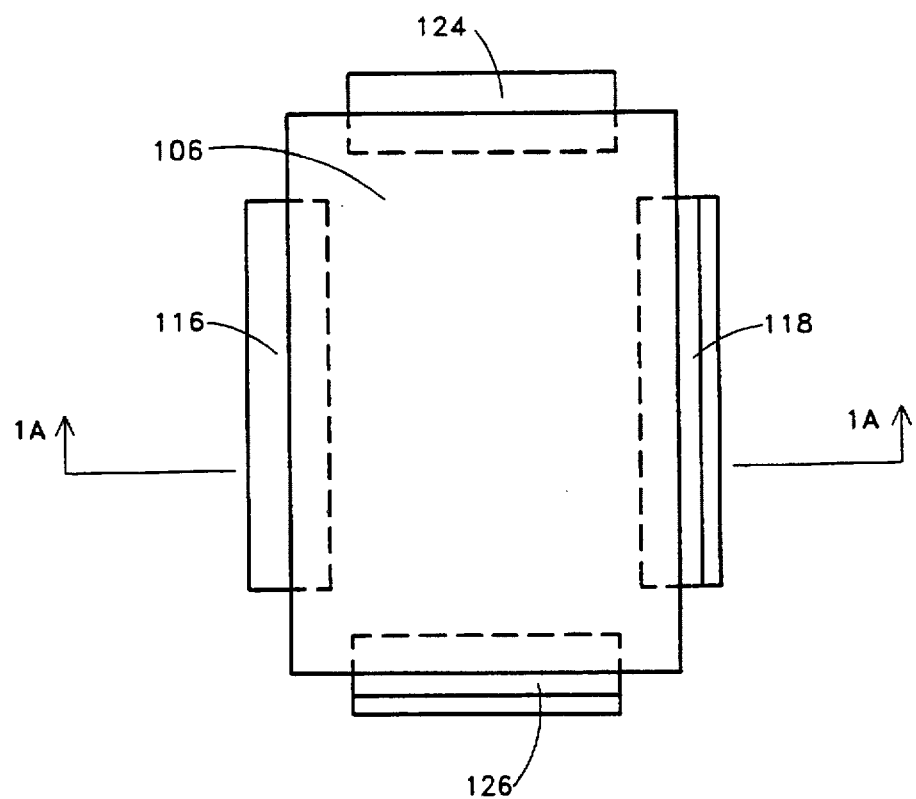

FIG. 1B shows a plan view of a detail of the assembly whereby pre-formed spacers 116, 118, 124, 126 are disposed on top of membrane 102 and provide support along the edges of module 106 to which they are fixedly connected or made integral. FIG. 1A shows dimension h representing the distance between the module and the roofing membrane. The assembly has preferred dimensions whereby h measures 2.5 cm (1 inch) to 15.2 cm (6 inches), depending upon the temperature to which the module and other components are to be limited. The photovoltaic modules are preferably sized in the range of 61 cm (2 feet) by 122 cm (4 feet) to 122 cm (4 feet) by 244 cm (8 feet), which dimension has been determined from wind tunnel test evaluation to be preferred from the standpoint of minimizing wind uplift and which dimension can be readily handled by a roofing installation crew.

Figure 1C:
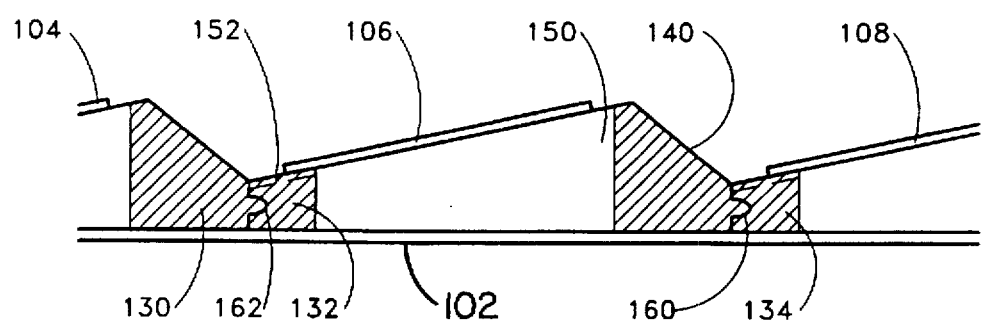

FIG. 1C shows a sectional view of an alternate detail of the assembly whereby spacers 130, 132, 134 have a tapered profile and are disposed on top of membrane 102 and provide support for modules 104, 106, 108 to which they are fixedly connected or made integral. Spacers 130, 132, 134 may be made of glass, concrete, plastic (vacuum-formed or other), insulation block, integral concrete over insulation block (such as the product known as Lightguard, by T. Clear Corporation), or other material.

Figure 1D:
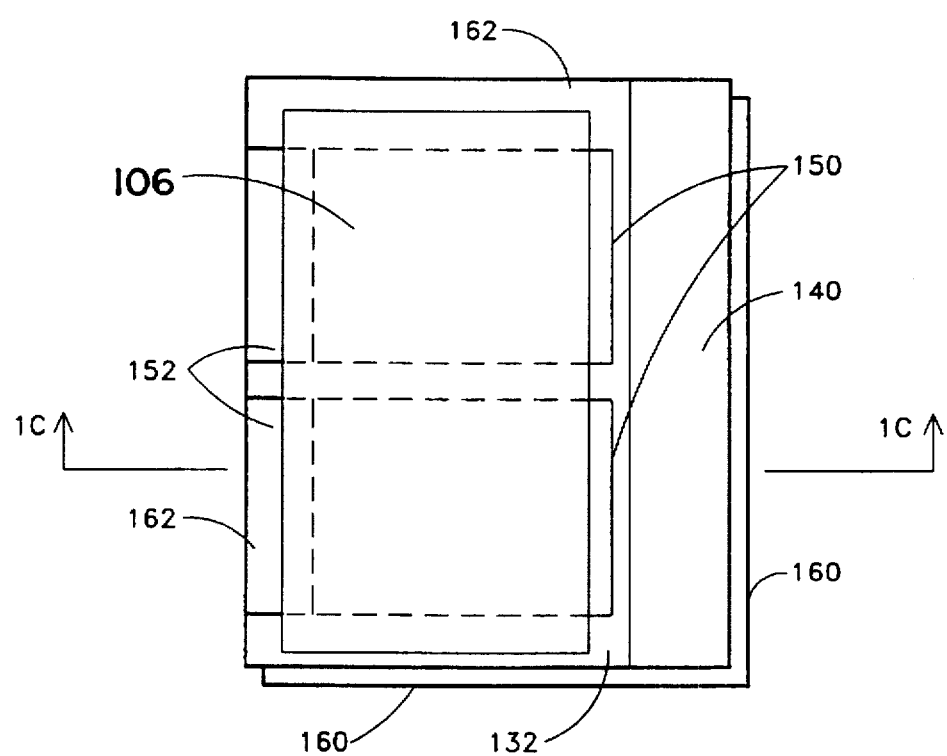

In FIGS. 1C and 1D spacer 132 is shown pre-formed with openings 150, 152 which enable free air exchange at the low and high sides of module 106 to the underside of the module 106. Such free air exchange with the spacer geometry shown has been determined through wind-tunnel testing to aid in the instantaneous equilibration of air pressures between the top and bottom side of module 106, thus reducing net forces of wind uplift.

In FIGS. 1C and 1D spacer 132 is shown pre-formed with a tapered profile 140 between its highest point along the high edge of module 106 extending downward to the low edge of adjacent module 108. Tapered profile 140 serves as an aerodynamic wind-block, causing wind which is traveling from the right in the drawing to flow over the top of module 106, and obstructing its entry to the backside of module 106.

In FIGS. 1C and 1D spacer 132 preferably has a tongue profile 160 along two edges and a groove profile 162 along its other two edges such that spacer 132 interlocks with adjacent spacers. In this way, interlocking joints are formed between adjacent integral assemblies for better resistance to wind uplift. However, any means of integral locking is possible.

The preferred method of manufacture of the solar roofing assembly is indicated as follows: Modules 104, 106, 108 are added to, bonded to, or otherwise attached to, respective spacers 112, 114, 116, 118, 120, 122, 124, 126 (or for sloped modules, spacers 130, 132, 134) in the manufacturing plant or in the field. A roofing membrane is placed on a roof. The modules and spacers are placed in arrays on top of the roof membrane. Roofing pavers are situated around the perimeter of photovoltaic modules and interlock at the perimeter of the modules. Such construction results in a simple, readily assembled roofing assembly which can be lightweight while resisting the forces of wind uplift.

The advantages of the foregoing assembly include:

1. The assembly is lightweight (9.76–19.53 kg/sq. m or 2–4 pounds/sq. ft.) relative to conventional roofing ballast (48.8–73.2 kg/sq. m or 10–15 pounds/sq. ft.), relying on a combination of weight, edge to edge connection, and spacer geometry to resist the forces of wind uplift.

2. The photovoltaic roofing assembly, which can be used on a flat or mildly sloping roof, minimizes water leakage through the roof.

3. The photovoltaic module provides multiple functions as a roofing component, including ballast, weather protection, and UV protection for the membrane layer below.

4. By displacing roofing components and their installation, the value of the photovoltaic module is enhanced, thereby enhancing the cost-competitiveness of energy from a clean and renewable resource.

5. The cost of installation of the assembly is minimized due to ease of fabrication and simple construction. Quality control is maximized by using shop assembly.

6. The solar roofing modules are reusable. They can be readily disconnected and reassembled onto other rooftops. Spacers 112, 114, 116, 118, 120, 122 of the assembly can take several forms, but preferably follow the periphery of each of modules 104, 106, 108 while having openings that are between 5% to 50% of the edge length of the module. This geometry has been determined to be preferred as a result of extensive wind-tunnel testing, and results in near instantaneous and uniform equilibration of pressures at the top and bottom side of modules 104, 106, 108 under conditions of high windspeed, thus reducing net uplift forces due to wind-loads.

Description of FIGS. 2A–2D:
Spacers as Panelized System

Figure 2A:
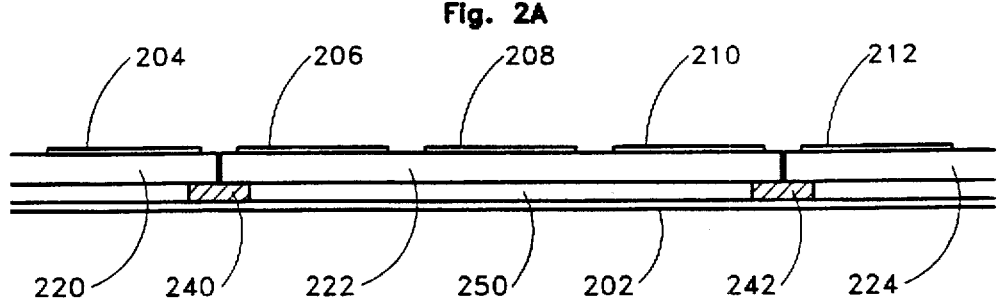
FIGS. 2A to 2D show views of a second embodiment of the invention, whereby the invention shown in FIG. 1 is a panelized system of photovoltaic modules.

FIGS. 2A–2D show section and plan views of a second embodiment of the invention. In FIG. 2A, the assembly includes a plurality of photovoltaic modules 204, 206, 208, 210, 212, a plurality of pre-formed spacers 220, 222, 224 which are respectively disposed below modules 204, 206, 208, 210, 212 and integral therewith, or fixed thereto. The spacers 220, 222, 224 rest on pedestals or supports 240, 242 which are disposed on top of a roofing membrane 202. Alternatively, spacers 220, 222, 224 may rest directly on membrane 202.

Spacers 220, 222, 224 of the assembly can take several forms, including c-channels, plastic tube, or metal bar.

Figure 2B:
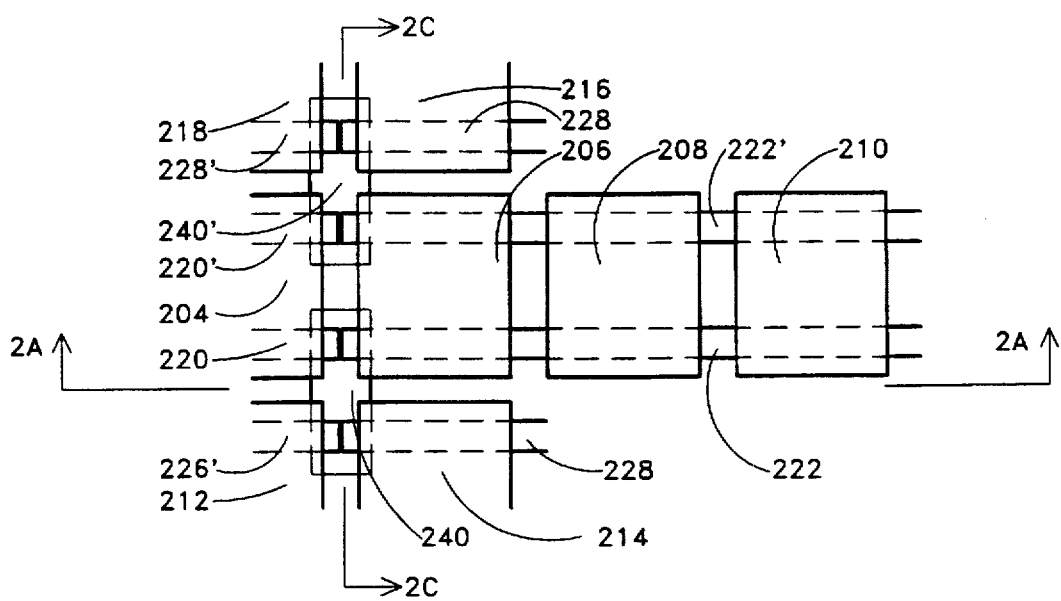

FIG. 2B shows a plan view of a detail of the assembly whereby spacers 220, 220', 222, 222', 226, 226' provide support for modules 204, 206, 208, 210, 212, 214, 216, 218 to which they are fixedly connected or made integral. Spacers 220, 220', 222, 222', 226, 226', 228, 228' also ensure consistent spacing between PV modules and enable water drainage.

Figure 2C:
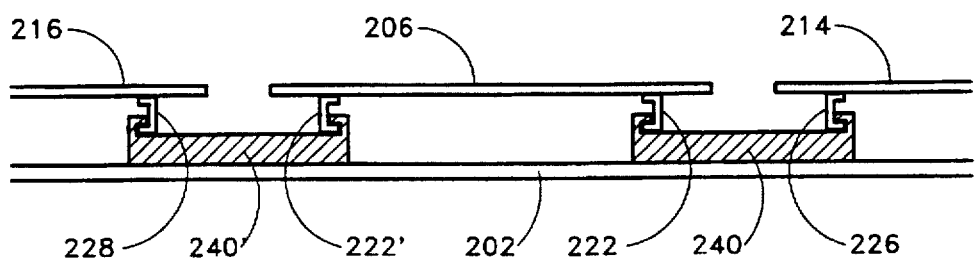

FIG. 2C shows a sectional end-view of the assembly whereby spacers 228, 222', 222, 226 are disposed on top of pedestals 240, 240' which are disposed on membrane 202. Pedestals 240, 240' may be made of concrete, plastic, insulation block, or other material and interlock with spacers 228, 222, 222', 226. Whereas FIG. 2C shows interlocking by intersecting c-channels, any means of interlocking is possible.

Figure 2D:
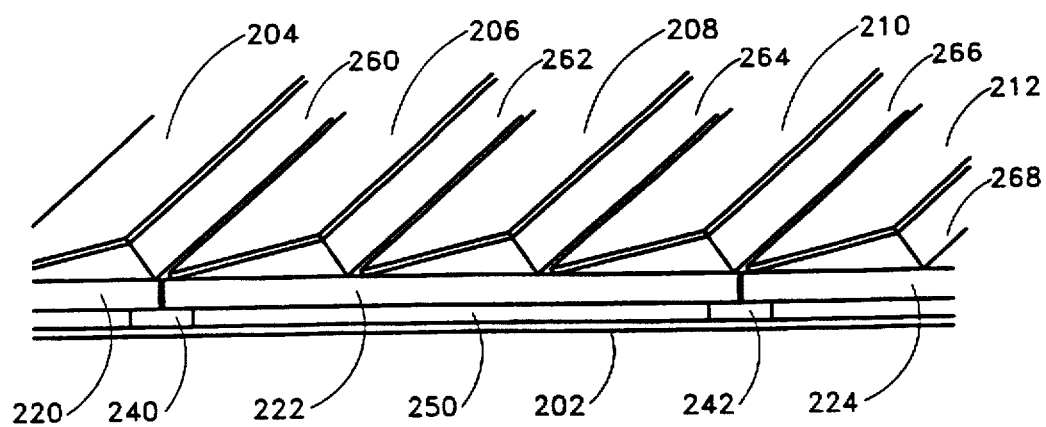

In FIG. 2D, the assembly of FIG. 2A is modified by sloping modules 204, 206, 208, 210, 212 and introducing windspoils 260, 262, 264, 266, 268 in order to deflect surface winds from entering below modules 204, 206, 208, 210, 212.

The advantages of the assembly of FIG. 2, which are in addition to the advantages of the assembly shown in FIG. 1, include:

1. Inclined photovoltaic modules 204, 206, 208, 210, 212 operate at a relatively high efficiency, due to their top surfaces being close to a plane normal to solar radiation.

2. By inclining the photovoltaic modules, natural convection using outside air as a convection fluid is enhanced, due to the facilitation of convective currents on the backside of a planar surface when that surface is inclined.

Description of FIGS. 3A–3D:
Spacer Geometry over Insulation Block

Figure 3A:
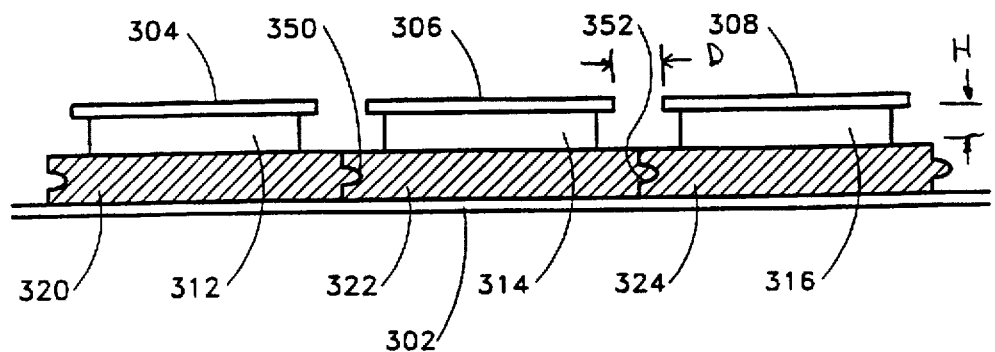
FIGS. 3A to 3D shows views of an alternate embodiment of the invention whereby spacers are attached to an insulation block and arranged in a geometry which minimizes wind uplift on the overall assembly, the outline of the location of the photovoltaic module shown in dashed lines in FIG. 3D.

FIG. 3A shows a sectional view of a photovoltaic roofing assembly. The assembly includes a plurality of photovoltaic modules 304, 306, 308, a plurality of pre-formed spacers, pedestals, or supports 312, 314, 316 which are respectively disposed below the plurality of photovoltaic modules 304, 306, 308 and integral therewith, or fixedly connected thereto. Spacers 312, 314, 316 are disposed on top of insulation blocks 320, 322, 324 which are disposed on a roofing membrane 302.

Figure 3B:
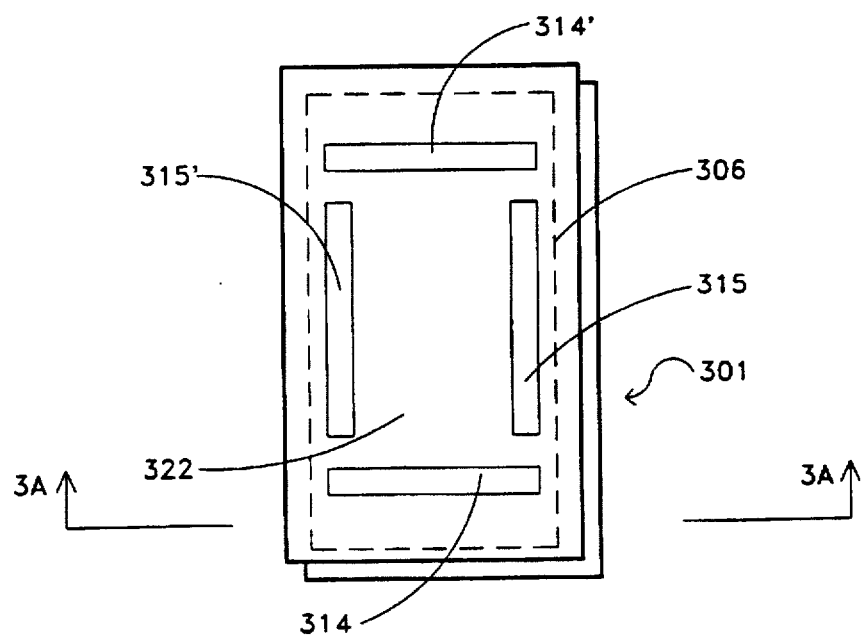

FIG. 3B shows a plan view of a single roofing tile 301, made of insulation block 322 and spacers 314, 314', 315, 315'. The outline of the position of photovoltaic module 306 is shown in dashed lines. Spacers 314, 315' preferably follow the periphery of module 306 while leaving openings to the interior of tile 301 that are between 5% to 50% of the edge length of module 306. This geometry results in the formation of negative interior pressures under conditions of high windspeed, thus reducing net uplift forces due to wind-loads, as determined by wind-tunnel testing.

Looking at FIG. 3B, wind tunnel investigations determined that the preferred mode of operation is where spacers are normal to the direction of the wind and following close to the perimeter of the module. Poor performance is experienced where there is continuous blocking of the interior cavity around the perimeter of the module. Optimal holddown occurs where the modules have some small degree of opening to the interior cavity, in the range of 10%–30%. In the latter configuration, the best performance is experienced when the ratio of d/h is in the range of 0.2–0.6, or greater than 1.20.

Figure 3C:
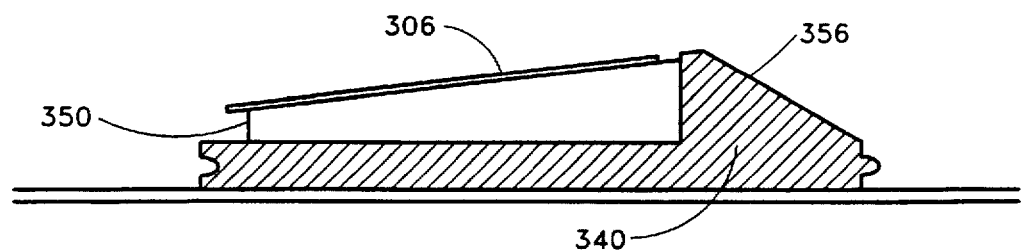

FIG. 3C shows a sectional view of an alternate detail of the assembly whereby tile 301' consists of photovoltaic module 306 supported by spacer 350 resting on insulation block 340. Insulation block 340 has a tapered profile in order to orient module 306 in the direction of increased sun exposure. Alternatively, spacer 350 could have a tapered profile. Insulation block 340 is shaped such that its top-most portion blocks the entry of surface winds from entering beneath module 306.

Looking at FIG. 3C, wind tunnel investigations determined that system performance is relatively insensitive to module slope where slope is in the range of 5°–12°. Better performance was experienced where the shape of the cavity beneath the PV module is triangular, as in FIG. 3C, rather than rectangular.

Figure 3D:
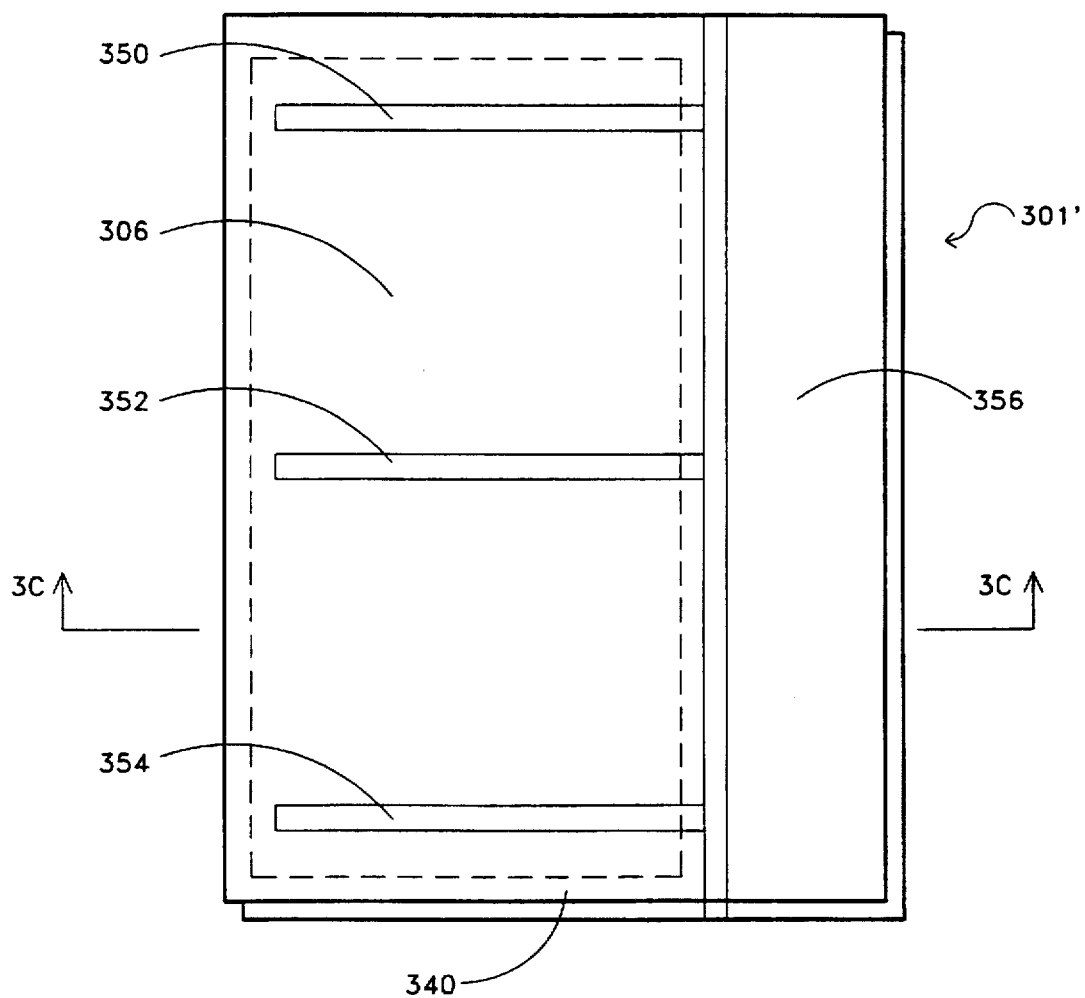

FIG. 3D shows a plan view of tile 301' whereby spacers 350, 352, 354 are located below module 306 and fixedly connected thereto, thus enabling free air exchange at the low and high sides of module 306. Such free air exchange with the spacer geometry shown has been determined through wind-tunnel testing to aid in the instantaneous equilibration of air pressures between the top and bottom side of module 306, thus reducing net forces of wind uplift.

In FIGS. 3C and 3D spacer 340 is shown pre-formed with a tapered profile 356. Tapered profile 340 serves as an aerodynamic wind-block, causing wind which is traveling from the right in the drawing to flow over the top of module 306, and obstructing its entry to the backside of module 306.

The advantages of the foregoing assembly include, in addition to the advantages of FIG. 1:

1. The spacer geometry serves to reduce to net forces of wind uplift, thus enabling the assembly to be lightweight (9.76–19.53 kg/sq. m or 2–4 pounds/sq. ft.) relative to conventional roofing ballast (48.8–73.2 kg/sq. m or 10–15 pounds/sq. ft).

2. The roofing tiles provide roofing insulation as well ballast, weather and UV protection for the membrane layer below.

Figure 4A:
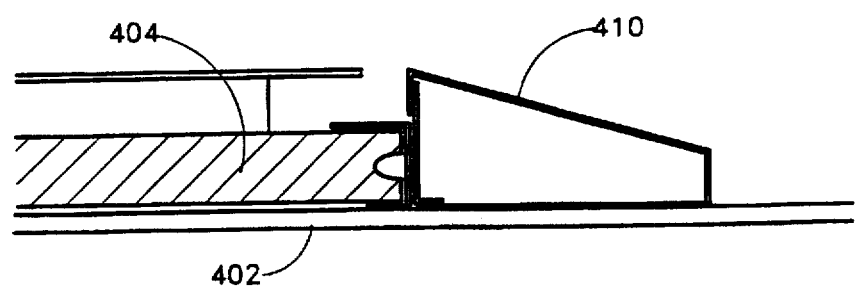
FIGS. 4A to 4B show views of various means of perimeter securement installed according to the invention.
Figure 4B:
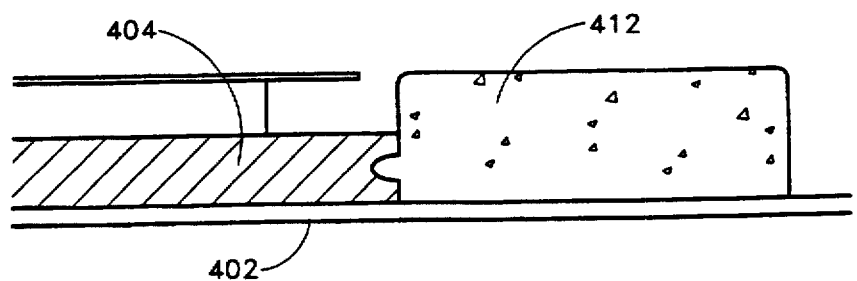

Description of FIGS. 4A–4B:
Perimeter Securement

FIGS. 4A–4B shows sectional views of alternate means of perimeter securement for the roof tile system. FIG. 4A shows metal flashing 410 running the perimeter of an array of roof tiles and interlocking with insulation block 404. Metal flashing 410 is shaped to accept electrical conductors (not shown) which run the perimeter of the assembly. FIG. 4B shows concrete paver 412 interlocking with insulation block 404. Whereas FIG. 4B shows interlocking by tongue and groove, any other means of interlocking is possible, including the use of metal z-flashing between the insulation block and paver.

Figure 5:
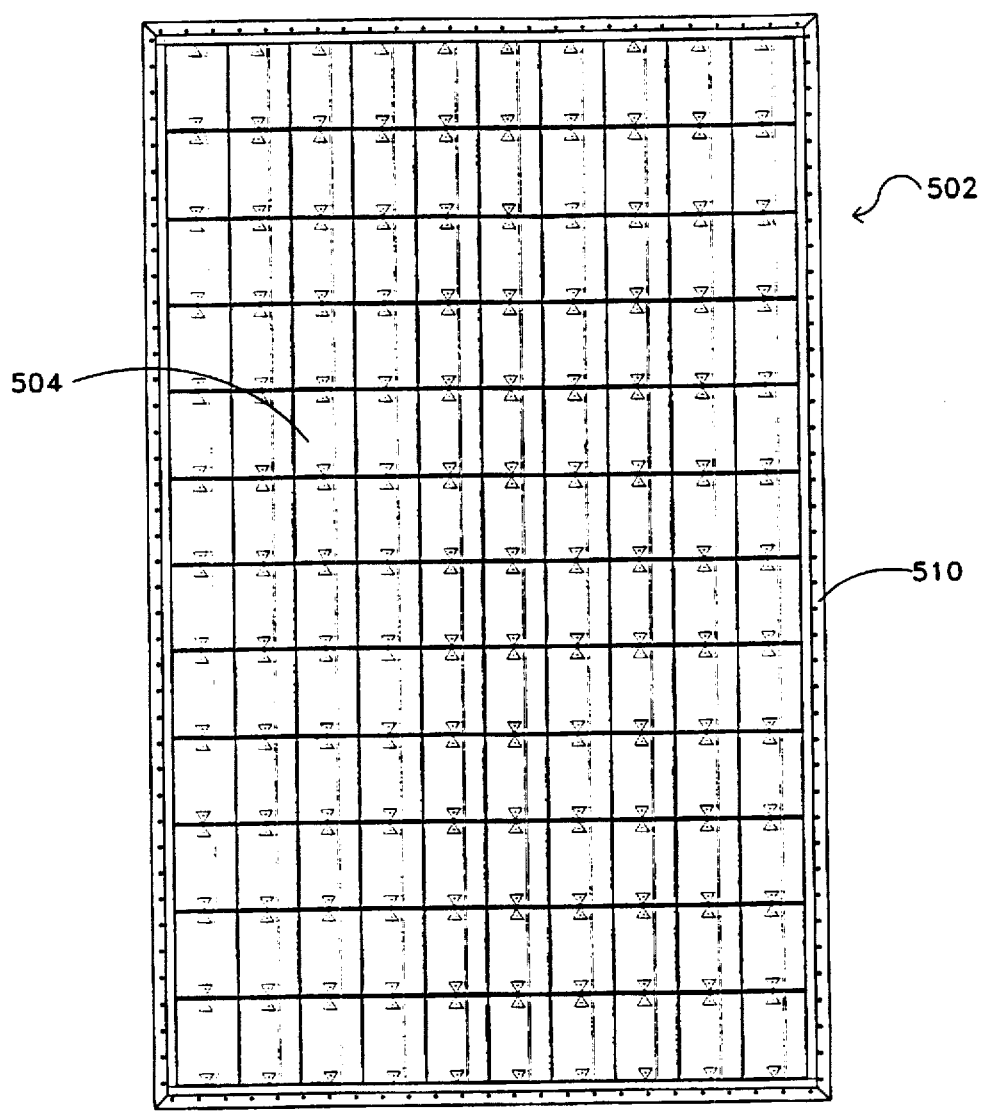
FIG. 5 shows a plan view of a building with a photovoltaic roofing assembly installed according to the invention.

Description of FIG. 5
Plan View of the Photovoltaic Roofing Assembly

FIG. 5 shows a perspective view of the photovoltaic roofing assembly where solar roofing tiles 504 form an array 502 which is situated on a building rooftop. Perimeter securement 510 runs the perimeter of array 502 and ties the roofing tiles 504 into an integral assembly.

While the invention has been described in its preferred embodiments, it is to be understood that the words which have been used are words of description rather than limitation and that changes may be made within the purview of the appended claims without departing from the true scope and spirit of the invention in its broader aspects.

The present invention provides a simple, efficient, quickly installed, reusable, and low-cost solar module assembly for roofs or other flat or mildly sloping surfaces whereby internal geometries of the roofing tile components minimize the net forces of wind uplift.

While the above description contains many specificities, these should not be construed as limitations on the scope of the invention, but rather as an exemplification of one preferred embodiment thereof. Many other variations are possible. For example, the integral solar module unit consisting of a solar module bonded to insulation block can be utilized independent of a roofing membrane. As a further example, the solar roofing assembly may include an additional layer consisting of fabric or other material disposed above the roofing membrane and below the photovoltaic module with spacers, which layer may provide an additional protective barrier for the roofing membrane and/or slipsheet.

As a further example, the solar modules with pedestals or spacers may include leveling plates placed under or over the pedestals or spacers for leveling the photovoltaic modules, or for achieving a pre-determined slope of the photovoltaic modules.

As a further example, the insulation block may be coated with an intumescent coating or other means of fireproofing in order to achieve a desired fire rating as a building roofing assembly.

As a further example, whereas the edge to edge connection between adjacent modules was often shown as a tongue and groove assembly, any means of edge connection is possible, including mechanical clips, adhesives, "skewer" inserts which penetrate the insulation block, and other means. In addition, the positive connection between modules may be accomplished as follows. The photovoltaic modules may rest on spacers which in turn rest on insulation board which is loose laid on the roofing membrane. The photovoltaic modules may then span and be bonded to adjacent insulation blocks which would provide a positive connection between adjacent insulation blocks and adjacent photovoltaic modules. The latter would assist the assembly in resisting the forces of wind uplift.

As a further example, the top of all insulation blocks may be painted with a paint which is opaque to ultraviolet radiation, thereby lengthening the life of the insulation block in applications where the photovoltaic module is not opaque to ultraviolet radiation.

As a further example, the spacers need not be made integral with the photovoltaic module in the shop, but may be laid in the field as stringers and the PV modules attached thereto in the field.

As a further example, the angle of the photovoltaic module can range from about 0°–30°, preferably about 5°–30°, and more preferably about 5°–12°.

Accordingly, the scope of the invention should be determined not by the embodiments illustrated, but by the appended claims and their legal equivalents.

What is claimed is:

1. A photovoltaic assembly comprising:

a photovoltaic module having sides and having upper and lower surfaces; and a spacer secured to the lower surface of the photovoltaic module;

said spacer sized and configured to define:
an open region beneath said lower surface and including access openings formed therein for fluidly coupling said open region to said upper surface;

said access openings extending along at least two sides of said photovoltaic module;

whereby wind uplift forces are resisted when said photovoltaic assembly is mounted to a support surface.

2. The assembly according to claim 1 wherein said photovoltaic module has at least three sides.

3. The assembly according to claim 2 wherein said spacer comprises multiple spacer elements, at least one said spacer element secured to said lower surface along each of said sides.

4. The assembly according to claim 2 wherein said access openings extend along said at least three sides of said photovoltaic module.

5. The assembly according to claim 1 wherein said at least two sides comprise two opposite sides of said photovoltaic module.

6. The assembly according to claim 1 wherein said access openings extend along about 5% to 50% of the length of at least two said sides.

7. The assembly according to claim 1 wherein said spacer has a lower spacer surface and an upper spacer surface tapered relative to said lower spacer surface, said tapered upper spacer surface supporting said photovoltaic module so said open region is a tapered open region tapering between said access openings along two of said sides.

8. The assembly according to claim 7 wherein said tapered upper spacer surface is at an angle of about 5°–12° relative to the lower spacer surface so said photovoltaic module is oriented at an angle of about 5°–30° relative to the support surface.

9. The assembly according to claim 7 wherein said photovoltaic module has an upper side, said photovoltaic module extending downwardly from said upper side, and further comprising a wind deflection surface having an upper edge near said upper side, said wind deflecting surface extending downwardly and outwardly away from said upper side.

10. The assembly according to claim 9 wherein said upper edge is about the same elevation as the upper side.

11. The assembly according to claim 1 further comprising an insulation member securable to the spacer when said spacer is situated between said photovoltaic module and said insulation member.

12. The assembly according to claim 11 wherein said spacer and insulation member forms a variable-height support structure for said photovoltaic module so that said open region is a tapered open region tapering between said access openings along two of said sides.

13. The assembly according to claim 12 wherein said photovoltaic module has an upper side, said photovoltaic module extending downwardly from said upper side, and wherein said insulation member comprises a wind deflection surface having an upper edge near said upper side, said wind deflection surface extending downwardly and outwardly away from said upper side.

14. The assembly according to claim 13 wherein said spacer comprises a plurality of elongate tapered spacers spaced apart from one another.

15. The assembly according to claim 11 wherein said photovoltaic module, insulation member, and spacer have a combined weight of about two to four pounds per square foot.

16. The assembly according to claim 11 wherein said photovoltaic assembly comprises means for interengaging said photovoltaic module, spacer, and insulation member to create an integral assembly for resisting the forces of wind uplift thus enabling lower installed weight per unit area.

17. The assembly according to claim 1 wherein said photovoltaic assembly comprises means for interlocking one said photovoltaic module to another said photovoltaic module.

18. The assembly according to claim 1 wherein said photovoltaic module and spacer have a combined weight of about two to four pounds per square foot.

19. A photovoltaic assembly, comprising:
a plurality of spacers configured for disposal on top of a building roof;
a plurality of photovoltaic modules having sides and disposed on top of said spacers to form a photovoltaic array; and
said spacers:
being arranged in a geometry which generally follows the sides of said photovoltaic modules; and
having openings that are between about 5% and 50% of the length of at least two sides of each photovoltaic module;
whereby said geometry enables said photovoltaic assembly to resist forces of wind uplift.

20. The assembly of claim 19 wherein said spacers have a top surface which is joined to said photovoltaic modules, forming an integral unit.

21. The assembly of claim 19 wherein said spacers are positioned adjacent to one another with said photovoltaic modules spaced apart from one another, whereby water may drain between said photovoltaic modules.

22. The assembly of claim 19 further comprising perimeter ties situated around the array and joined with said array to make an integral array assembly.

23. The assembly of claim 22 wherein said perimeter ties are joined with one another whereby the integral array assembly is tied together and strengthened.

24. The assembly according to claim 22 wherein said perimeter ties comprise a chosen one of concrete pavers and hollow metal flashing units.

25. The assembly of claim 19 wherein said assembly further comprises means for resisting forces of wind uplift sufficiently to eliminate the need for penetrations of a building roof.

26. The assembly of claim 19 wherein said spacers are preformed spacers.

27. The assembly of claim 19 wherein said spacers have a tapered profile for orienting the photovoltaic module in a direction for increased sun exposure.

28. The assembly of claim 27 wherein said spacers have tapered profiles with first outwardly and downwardly tapered portions supporting said photovoltaic modules and defining a tapered air-space and second outwardly and downwardly tapered portions, whereby wind is caused to flow over the spacer and not underneath the photovoltaic module,
whereby internal pressures within the tapered air-space created by the spacers offset external pressures which aids the overall assembly in resisting net forces of wind uplift.

29. The assembly of claim 19 wherein said spacers are sized to orient the photovoltaic modules at an angle of about 5°–12° and create a tapered air space beneath the photovoltaic modules.

30. The assembly according to claim 19 wherein said photovoltaic array has a weight of about two to four pounds per square foot.

31. A photovoltaic roofing assembly, comprising:
a plurality of insulation blocks disposed as a layer on top of a roofing membrane;
a plurality of spacers configured for disposal on top of said insulation blocks;
a plurality of photovoltaic modules having sides and disposed on top of said spacers to form a photovoltaic array; and said spacers:
being arranged in a geometry which generally follows the sides of said photovoltaic modules; and
having openings that are between 5% and 50% of the length of at least two sides of each photovoltaic module;
whereby said geometry enables said photovoltaic assembly to resist forces of wind uplift.

32. The assembly of claim 31 wherein each of said insulation blocks have adjoining sides with a joint disposed between said sides for water drainage.

33. The assembly of claim 31 wherein said insulation blocks have top surfaces which are joined to the spacers which in turn are joined to photovoltaic modules, forming three-part integral units.

34. The assembly of claim 31 wherein said spacers are sized to orient the photovoltaic modules at an angle of about 5°–12° and create a tapered air space beneath the photovoltaic modules.

35. The assembly according to claim 31 wherein said photovoltaic array has a weight of no more than about four pounds per square foot.

36. A photovoltaic roofing assembly comprising:
a plurality of photovoltaic assemblies, each said photovoltaic assembly comprising:
a photovoltaic module having upper, lower, and lateral sides and having upper and lower surfaces; and
a variable-height spacer secured to the lower surface of the photovoltaic module so to orient said photovoltaic module at an angle with said lateral sides extending downwardly from said upper side to said lower side, said angle being about 5°–30° from horizontal;
said spacer sized and configured to define:
a tapered open region beneath said lower surface; and
access openings along said upper and lower sides fluidly coupling said open region to said upper surface;
whereby wind uplift forces are resisted when said photovoltaic assembly is mounted to a support surface; and
means for interengaging adjacent photovoltaic assemblies into an array of photovoltaic assemblies, said array defining a perimeter.

37. The assembly according to claim 36 wherein said perimeter assembly comprises a concrete paver.

38. The assembly according to claim 36 wherein said photovoltaic assembly further comprises a wind deflection surface, having an upper edge near the upper side, extending downwardly and outwardly away from said upper side.

39. The assembly according to claim 38 wherein said spacer provides said wind deflection surface.

40. The assembly according to claim 36 wherein said array of photovoltaic assemblies has a weight of no more than about four pounds per square foot.

41. A method of making a photovoltaic roofing assembly, comprising the following steps:
joining a spacer to a photovoltaic module;
sizing and positioning said spacer to provide an open region beneath said photovoltaic module and openings into said open region on at least two sides of said photovoltaic module to reduce wind uplift forces on the photovoltaic module;
joining an insulation layer to said spacer to create a three-part integral assembly; and
installing in the field said three-part integral assembly as a layer on top of a roofing membrane without forming penetrations through a roof surface;
whereby the completed assembly resists the forces of wind uplift.

42. The method of claim 41 further comprising the step of sizing said openings to comprise about 5% to 50% of the length of at least two sides of said photovoltaic module.

43. The method of claim 41 further comprising the step of providing said openings on all sides of said photovoltaic module.

44. The method of claim 41 further comprising the step of configuring said spacer to have a tapered surface to which said photovoltaic module is joined, said tapered surface having an angle of about 5°–30° from horizontal thereby forming said open region as a tapered open region.

45. The method according to claim 41 further comprising the step of providing said integral assemblies with interengagable lateral edges, and said installing step is carried out so that said lateral edges of adjacent integral units are interengaged.

46. The method according to claim 41 further comprising the steps of:
installing a plurality of said integral assemblies to form an array of said integral assemblies, said array having a periphery; and
joining perimeter ties to said periphery to stabilize said array.

47. A method of making a photovoltaic roofing assembly, comprising the following steps:
joining a spacer to a photovoltaic module to create a two-part integral assembly;
sizing and positioning said spacer to provide an open region beneath said photovoltaic module and openings into said open region to reduce wind uplift forces on the photovoltaic module;
configuring said spacer to support said photovoltaic module in a manner to form said open region as a tapered open region;
positioning said openings on at least two sides of said photovoltaic module, said two sides being opposite sides of said photovoltaic module, said tapered open region tapering between said openings on said two opposite sides;
installing in the field said two-part integral assembly as a layer above a roofing membrane;
whereby the completed assembly resists the forces of wind uplift.

48. The method of claim 47 further comprising the step of joining an insulation layer to said spacer to create a three-part integral assembly.

49. The method of claim 47 wherein said spacer configuring step is carried out so that said tapered surface has an angle of about 5°–30°.

50. The method of claim 47 wherein said installing step is carried out without forming penetrations through, or adhering the unit to, a roof surface.

51. The method according to claim 47 further comprising the steps of:
installing a plurality of said integral assemblies to form an array of said integral assemblies, said array having a periphery; and
joining perimeter members to said periphery to stabilize said array.

52. A photovoltaic assembly comprising:
an array of interlocking photovoltaic units, said array having a perimeter, each said photovoltaic unit comprising:

a photovoltaic module having an upper surface;

an insulation layer;

a spacer coupling the photovoltaic module and the insulation layer and defining an open region therebetween; and an access opening fluidly coupling said upper surface of said photovoltaic module and the open region; and said array having a weight of about two to four pounds per square foot;

whereby the configuration of the photovoltaic assembly resists wind uplift without the need for roof surface penetrating elements.

53. The photovoltaic assembly according to claim 52 further comprising a perimeter assembly joined to said perimeter of said array.

54. A method for making a photovoltaic roofing assembly comprising the following steps:

selecting a photovoltaic unit having an outer photovoltaic module, an insulation layer, and a spacer coupling the photovoltaic module and insulation layer to define an open region therebetween, the outer photovoltaic module having an outer surface;

the selecting step comprising the step of selecting a photovoltaic unit weighing no more than about four pounds per square foot;

placing a plurality of said photovoltaic units on a roof surface without securing the units to the roof surface to form an array of said photovoltaic units;

said selecting and placing steps further comprising the step of providing at least one access opening for each said photovoltaic unit fluidly coupling the outer surface of said photovoltaic module and said open region; and surrounding the array with a perimeter assembly without securing the perimeter assembly to the roof surface.

* * * * *